United States Patent [19]

Wu

[11] Patent Number: 5,186,569
[45] Date of Patent: Feb. 16, 1993

[54] CHAIN CONNECTOR

[76] Inventor: Chia L. Wu, No. 734, Chung Shan Rd., Kuei Jen Hsiang, Tainan Hsien, Taiwan

[21] Appl. No.: 680,905

[22] Filed: Apr. 5, 1991

[51] Int. Cl.⁵ .................. F16C 11/00; F16G 13/18
[52] U.S. Cl. ........................... 403/154; 59/85; 474/220
[58] Field of Search ............... 59/4, 5, 84, 85, 87; 474/218, 220, 219, 223, 224; 403/300, 155, 315, 375, 154

[56] References Cited

U.S. PATENT DOCUMENTS

| | | | |
|---|---|---|---|
| 1,121,053 | 12/1914 | Terry | 474/218 |
| 3,877,688 | 4/1975 | McCarty | 474/220 X |
| 4,041,790 | 8/1977 | Paul | 474/220 |
| 4,043,215 | 8/1977 | Long et al. | 59/85 X |
| 4,266,435 | 5/1981 | Bendall | 403/154 X |

FOREIGN PATENT DOCUMENTS

| | | | |
|---|---|---|---|
| 239505 | 8/1962 | Australia | 59/84 |
| 684160 | 12/1952 | United Kingdom | 59/85 |

Primary Examiner—Peter M. Cuomo
Attorney, Agent, or Firm—Staas & Halsey

[57] ABSTRACT

A chain connector includes a second chain plate being integrated with a chain pin in each lateral portion thereof, each chain pin having an annular groove adjacent to an end distal to the second chain plate to form a neck portion. A first chain plate has a biased hole in each lateral portion thereof corresponding to chain pins respectively, the biased hole having an inward flange along a lower portion of a periphery thereof to engage with the neck portion of the pin inserted through an end link of a chain to connect the chain.

5 Claims, 5 Drawing Sheets

CHAIN CONNECTOR

BACKGROUND OF THE INVENTION

This invention relates to a chain connector.

It is known that a length of chain depends on a required condition, thus a chain is linked by a plurality of links to form a sufficient length. While being used the chain is cut to a desired length by removing additional links and then connected by a chain connector to form a closed loop for transferring power or energy.

A traditional chain connector is composed of a pair of chain plates, each having a hole in a lateral portion thereof, and a pair of chain pins. In operation, the pair of chain plates is located respectively on each side of an end link of the chain with a half portion thereof, and then a chain pin is driven through the chain plates and end link to combine those elements. In the same manner, another end link of the chain is combined to another half portion of the chain plates by the second chain pin, such as to form a closed loop of the chain.

It is found that if the chain pin is not inserted in a perpendicular manner, i.e., driven through in an oblique direction under a skidding condition or the like, the inserting operation of the chain pin usually causes the hole of the chain plate to become overly enlarged, preventing a suitable engagement with the chain pin, or rendering a chain pin bushing deposited in the link to be fixedly engaged with a roller deposited between chain plates of the end link, such that a performance of the chain connector suffers. Both cases greatly reduce the service life of the chain.

Furthermore, since the traditional chain pin provides a smooth longitudinal surface to be inserted into a link, there is not any blocking means for resisting a lateral force caused by vibration of the chain. Thus, the outer chain plates of the chain connector easily disengage from a connecting position, allowing possible breakage. This is dangerous for a rider.

A chain pin with an annular groove has been provided for a better fixing effect with the outer chain plate, which provides a biased engaging hole to engage with the chain pin. It is found that the annular groove of the chain pin contacts the hole of the outer chain plate merely at a tangent point thereof, such that the blocking effect is not satisfied: the outer chain plate usually skids from the chain pin, leading to a breaking condition. Moreover, the chain pin protruding from the chain plate makes noise during shifting. Therefore, an improvement for the traditional chain connector is needed.

SUMMARY OF THE INVENTION

This invention provides a chain connector which comprises a first chain plate, a second chain plate, and a pair of chain pins. The chain pins each have a countersink head on a first end thereof and an annular groove adjacent to a second end thereof. The second chain plate has a countersunk hole in each lateral portion thereof for receiving the countersink head of the chain pin. The first chain plate has a biased hole in each lateral portion thereof, and more particularly, each biased hole has an inward flange along a lower portion of a periphery thereof, providing an additional opening to engage with the groove of the chain pin.

Therefore, it is a primary object of this invention to provide a chain connector which has a better performance than the conventional chain connector in firmly connecting end links of a chain.

It is further an object of this invention to provide a chain connector which is easily fixed for a connecting operation.

It is another object of this invention to provide a chain connector which has no apparent projection after completing a fixing operation.

Yet a further object of this invention is to provide a chain connector which has a larger contacting area between an outer chain plate and a chain pin.

DETAILED DESCRIPTION OF THE PREFERRED EMBODIMENT

Figure 1:
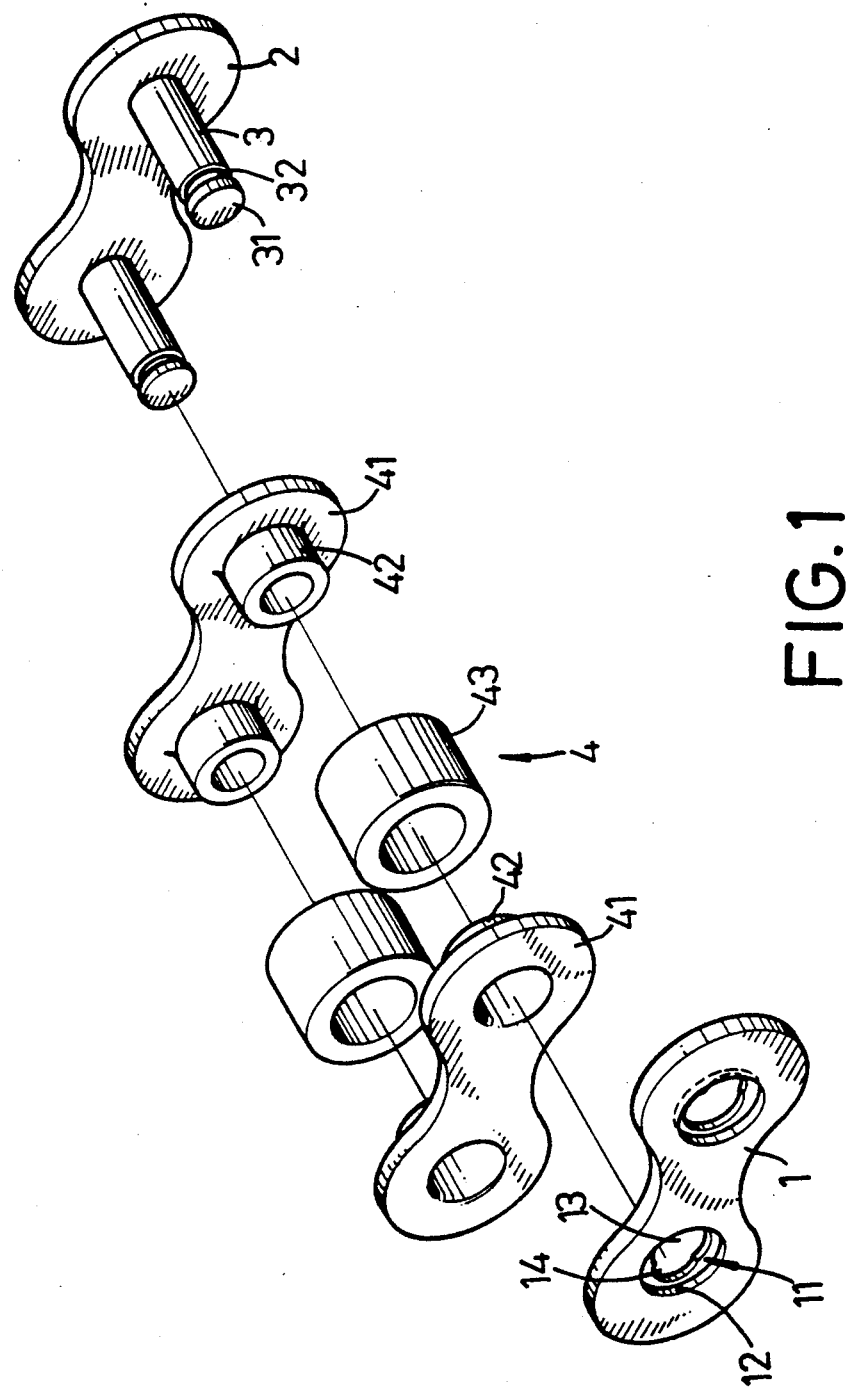
FIG. 1 is an exploded view a chain connector according to this invention, showing an end link of a chain.
Figure 2:
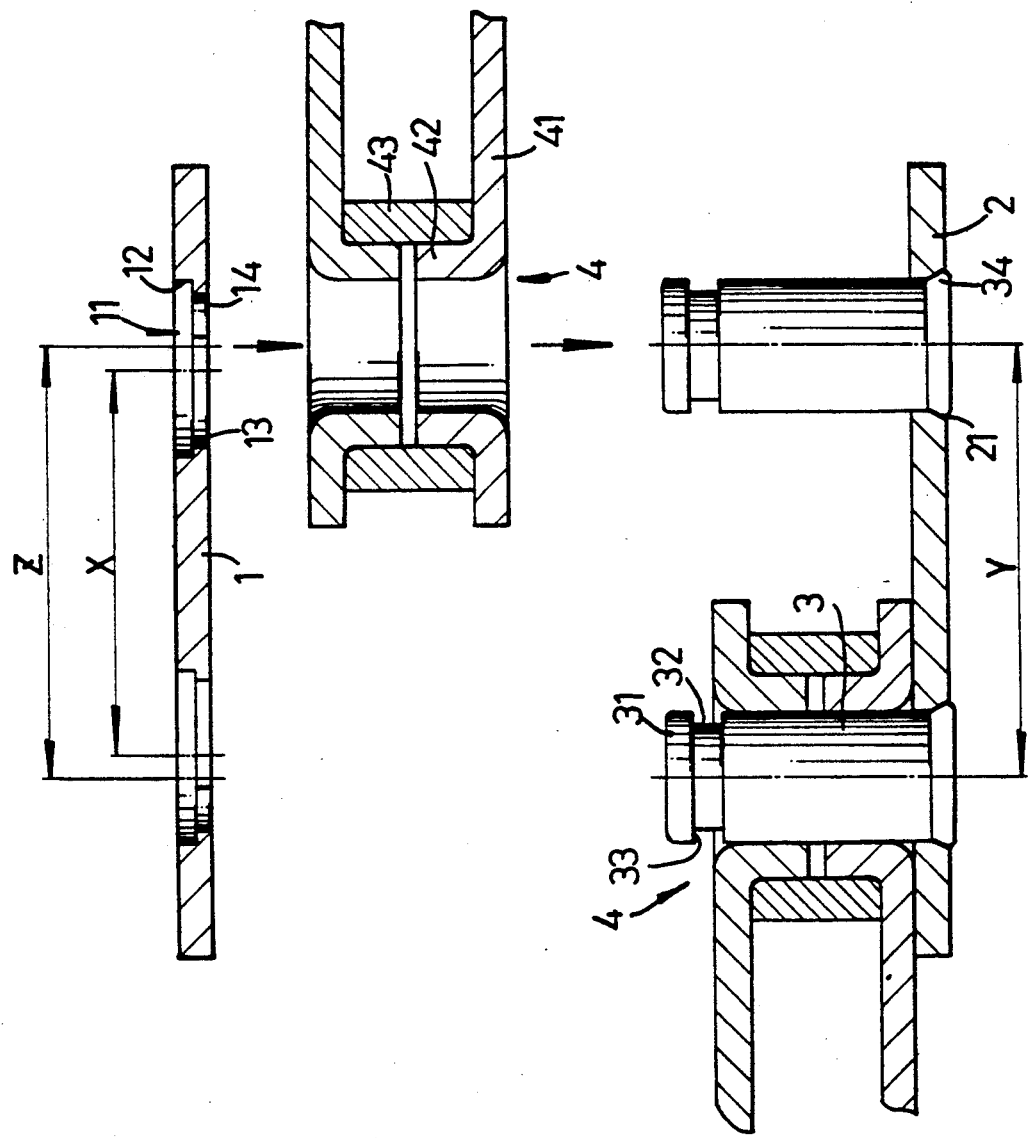
FIG. 2 is a partially cross-sectional exploded view taken from a top elevation to illustrate an operation of a chain connector according to this invention.

A chain connector according to the present invention, referring to FIGS. 1 and 2, comprises a first chain plate 1, a second chain plate 2, and a pair of chain pins 3. The chain plates and 2 are shaped substantially as a known dumbbell shape, i.e., two circular portions connected by a narrowed waist portion. A chain is composed of a plurality of links, each comprising a pair of outer chain plates, a pair of inner chain plates, and a pair of rollers, being combined and linked by chain pins. It is noted that both end links 4 of a chain include a pair of inner chain plates 41 with a hole on each lateral portion thereof, which has an inward peripheral flange 42 thereon, and a pair of rollers 43, such as shown in FIG. 1. The inward peripheral flange 42 is capable of being inserted into the roller 43, rotatably supporting the roller 43, particularly seen in FIG. 2.

The second chain plate 2 of the chain connector has a countersunk hole 21 in each lateral portion thereof. The chain pin 3 provides a countersink head 34 on a first end thereof so as to abut a sloped surface around the countersunk hole 21 when the chain pin 3 is inserted into the second chain plate 2. It is noted that there is not any apparent projection of the chain pin 3 from an outer surface of the second chain plate 2 because of the countersink 21, such as shown in FIG. 2. During assembly, the chain pins 3 are inserted into the holes 21 to form a basic unit, such as shown in FIG. I.

Each chain pin 3 has an annular groove adjacent to a second end thereof so as to form a neck portion 32 and a head portion 31 with a lower wall 33 on the second end thereof.

Figure 3:
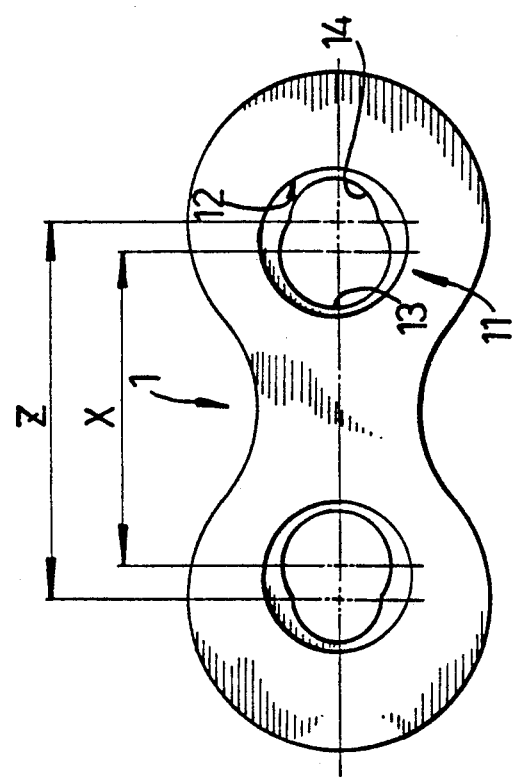
FIG. 3 is a side view of a first outer chain plate of the chain connector according to this invention.

The first chain plate 1 of the chain connector has a figure similar to the second chain plate 2 and provides a biased hole 11 in each lateral portion thereof corresponding to the countersunk hole 21 of the second chain plate 2. Each biased hole 11 has an inward flange projecting towards a center of the biased hole along a lower portion of a periphery thereof, such as shown in FIG. 2, forming a shallow recess 12 in an upper portion of the biased hole 11. Referring to FIGS. 2 and 3, the inward flange terminates with a specifically configured opening formed therein, which has a shape substantially the same as a first biased circle 13, which has a diameter larger than that of the chain pin 3, merged with a second biased circle 14, which has a diameter substantially equivalent to that of the neck portion 32 of the chain pin 3.

It is noted that the distance X between two first circular openings 13 is smaller than the distance Y between the chain pins 3, while the distance Z between two second circular openings 14 is substantially equal to the distance Y.

For assembly, end links 4 of a chain desired to be connected receive the chain pins 3 of the second chain plate 2. Then the chain pins 3 are pressed toward each other to reduce a distance therebetween from Y to X to penetrate the first chain plate 1 through first openings 13 with head portions 31 thereof. Thus when the pressure is removed the chain pins 3 spring back by a restoring force of the second chain plate 2 to engage the neck portions 32 thereof with the second openings 14 of the inward flange.

Figure 4:
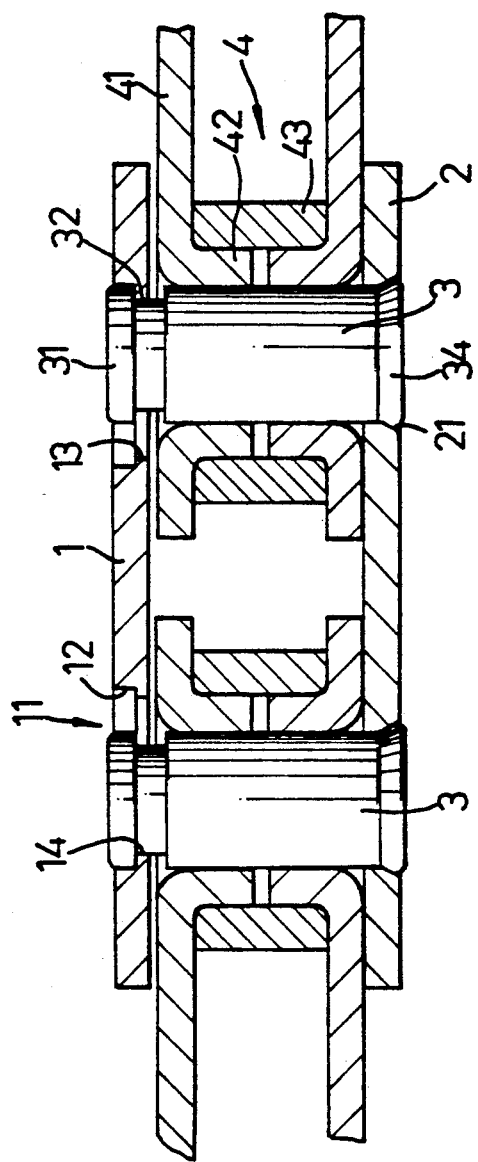
FIG. 4 is a view similar to FIG. 2, but in a combined condition.
Figure 5:
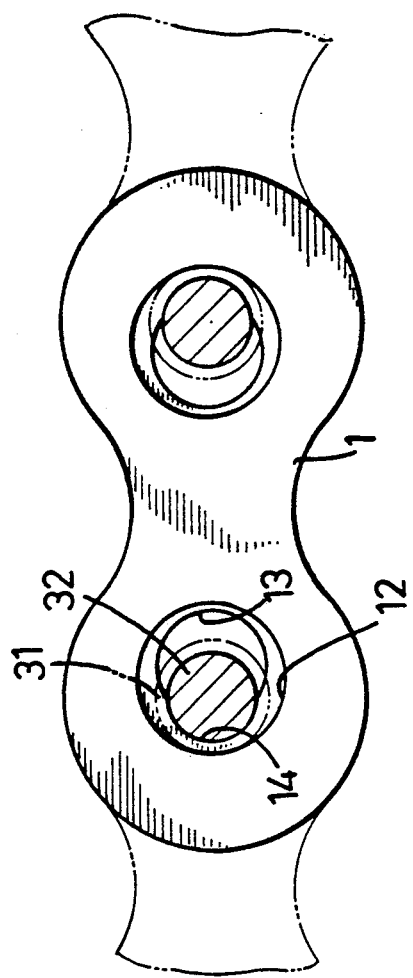
FIG. 5 is a side view of the chain connector shown in FIG. 4.

Referring to FIGS. 4 and 5, since there is the recess 12 formed in the biased hole 11 above the inward flange, the head portion 31 of the chain pin 3 is capable of resting in the recess 12 as the chain pin 3 engages with the inward flange such that there is no portion of the chain pin 3 protruding from an outer surface of the first chain plate 1. Moreover, since the inward flange provides the partially circular opening 14 with a radius substantially equivalent to that of the neck portion 32, when the chain pin 3 is in engagement with the inward flange, the opening 14 surrounds a part of a periphery of the neck portion 32, resulting in a larger confronting area between the lower wall 33 and the inward flange, so as to connect the link more securely than traditional chain connectors. The chain connector can be disengaged from the chain in a process reverse to the above described. Thus, this invention provides a simple, yet highly effective, chain connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim

1. A chain connector, comprising:
   a first plate having two lateral portions each including an opening formed therein, each opening being defined by a first substantially-circular inner hold overlapping a second, relatively smaller semi-circular outer hole, the centers of said first and second holes being co-linear;
   a second plate having two lateral portions each including a circular opening formed therein, the centers of said circular openings being coaxial with said centers of said second holes; and
   two pins each having a first end, and a second end near which a neck and head are formed;
   said first ends of said pins being inserted in said openings of said second chain plate and urged towards each other to permit said second ends of said pins to be inserted through said first holes of said first plate such that each neck is securely received in a respective second hole.

2. A chain connector as recited in claim 1, wherein a radius of said first hole is identical to a radius of said opening formed in the second plate.

3. A chain connector as recited in claim 1, wherein a radius of said second hole is identical to a radius of said neck.

4. A chain connector as recited in claim 1, wherein a radius of said opening formed in said second plate is identical to a radius of said pin.

5. A chain connector as recited in claim 1, wherein each opening formed in the first plate includes an area which has a thickness less than the remainder of said first plate.

* * * * *